United States Patent

[11] 3,619,664

[72] Inventor Albert H. Ashley
Holliston, Mass.
[21] Appl. No. 873,797
[22] Filed Nov. 4, 1969
[45] Patented Nov. 9, 1971
[73] Assignee GTE Sylvania Incorporated

[54] MONOSTABLE MULTIVIBRATOR CIRCUIT EMPLOYING A FEED FORWARD CIRCUIT

11 Claims, 4 Drawing Figs.

[52] U.S. Cl. ........ 307/273, 307/265, 307/293, 328/207
[51] Int. Cl. ........ H03k 3/284
[50] Field of Search ........ 307/273, 247, 260, 265, 272, 293; 328/207, 58, 59, 60, 61

[56] References Cited

UNITED STATES PATENTS

| | | | |
|---|---|---|---|
| 3,187,201 | 6/1965 | Eastman et al. | 307/273 X |
| 3,354,323 | 11/1967 | Douaihy | 307/273 X |
| 3,532,993 | 10/1970 | Kennedy | 328/307 X |

*Primary Examiner*—Stanley D. Miller, Jr.
*Attorneys*—Norman J. O'Malley, Elmer J. Nealon and Robert T. Orner

ABSTRACT: An improved monostable circuit employs a first gating circuit which, in response to an input trigger signal, activates the timing cycle of a timing circuit. A buffer output circuit supplies a second input signal to the first gating circuit to render the monostable circuit nonresponsive to another input trigger circuit until the timing circuit has completed the timing cycle. A feed forward circuit is connected between the output of the first gating circuit and the buffer output circuit to prevent false triggering of the monostable circuit due to noise signals on the circuit power supplies.

INVENTOR
ALBERT H. ASHLEY
BY Robert T. Orner
ATTORNEY

INVENTOR
ALBERT H. ASHLEY
BY
Robert T. Orner
ATTORNEY

MONOSTABLE MULTIVIBRATOR CIRCUIT EMPLOYING A FEED FORWARD CIRCUIT

BACKGROUND OF THE INVENTION

This invention relates to timing circuits and in particular to one-shot monostable multivibrator type circuits.

Limitations in the present monostable circuit configuration make it difficult to achieve an absolute value of delay with fixed value circuit elements and variations in power supplies and temperatures. Another inherent disadvantage of existing monostable circuits is that small variations in the input drive voltage are reflected in changes to the absolute value of delay in the output signal.

It is therefore, an object of this invention to provide a monostable circuit which provides a stable delay despite variations in the power supply, circuit elements and the input drive voltage. Another object of this invention is to provide a monostable circuit that is insensitive to noise pulses on the power supply lines.

SUMMARY OF THE INVENTION

Briefly, an improved monostable circuit according to the present invention employs a first gating means connected to a timing circuit. The output signal of the timing circuit is directed through a driving means to a buffer output means. Also connected to the buffer output means is a feed forward means connected from the common junction of the first gating means and the timing circuit. In operation, an input trigger from the first gating means initiates the timing circuit and receives an inhibiting pulse from the buffer output means to preclude a second input trigger signal from affecting the monostable circuit operation and to insure an output signal of constant duration. The output signal of the first gating means is also directed to the buffer output means via a feed forward means to prevent an output signal from the monostable circuit in the event the driving means is activated by noise and/or variations in the supply voltage.

BRIEF DESCRIPTION OF THE DRAWINGS

This invention will be more fully described in the following detailed description read in conjunction with the accompanying drawings in which.

DETAILED DESCRIPTION OF THE INVENTION

Figure 1:
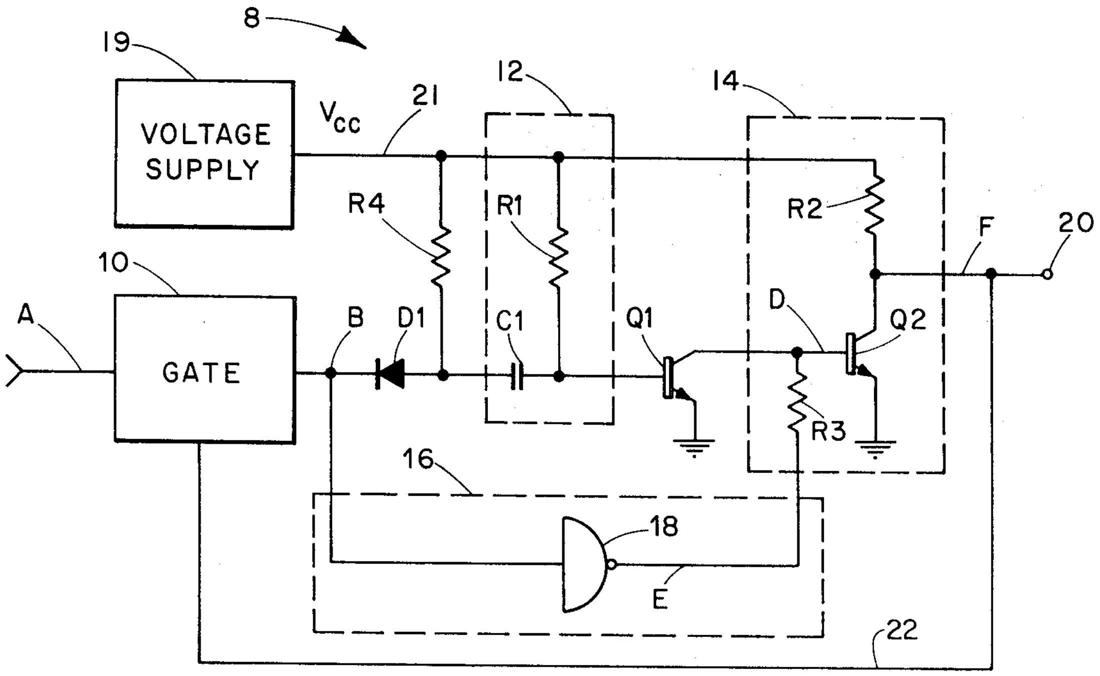
FIG. 1 is a schematic representation of one embodiment of an improved monostable circuit according to the present invention.

An improved monostable circuit according to the present invention is shown schematically in FIG. 1 and includes a first gating means 10, for example, a Sylvania Electric Products, Inc. integrated circuit SG80. The first gating means 10 has a first and second input connection and is operative in response to a trigger signal at the first input connection to change its output signal from a high voltage level as long as a second input signal is applied to the second input connection. The first gating means 10 is connected through a diode $D_1$ to the input connection of a timing circuit 12 such as a series connected capacitor $C_1$ and a first resistor $R_1$. The output of the timing circuit 12 is connected to a driving circuit such as a first transistor $Q_1$ having its base electrode connected to the timing circuit 12, its emitter electrode connected to ground and its collector electrode connected to a buffer output means 14.

THe buffer output means 14 includes a second NPN transistor $Q_2$ having its base electrode connected to the collector of the first transistor $Q_1$, its emitter electrode connected to ground and its collector electrode connected through a second resistor $R_2$ to a source of direct current energy such as the positive voltage supply 19 via line 21. Also connected to the base of the second transistor $Q_2$ through a third resistor $R_3$ is a feed forward means 16 such as an inverting gate 18. The input connection of the inverting gate 18 is connected to the common juncture of the first gating means 10 and the diode $D_1$. The output terminal 20 of the monostable circuit 8 (and of the output buffer means) has a feedback connection means such as line 22 to the second input connection of the first gating means 10. Also connected to the common juncture of the diode $D_1$ and the timing circuit 12 is one end of a fourth resistor $R_4$ which has its other end connected to the positive voltage supply 19 via line 21.

Figure 2:
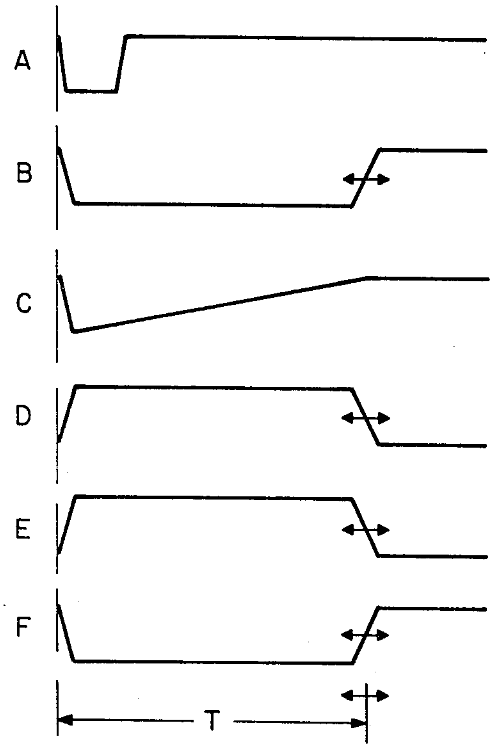
FIG. 2 is a series of waveforms useful in explaining the operation of the embodiment of FIG. 1.

The waveforms of FIG. 2 are useful in explaining the operation of the embodiment of FIG. 1. Under quiescent conditions, the first input connection of the first gating means is at a high voltage level condition. The second input connection is also at a high voltage level because it is connected to the collector of the second transistor $Q_2$ which is nonconducting. An input negative going trigger, as depicted in waveform A of FIG. 2, applied to the first input connection of the first gating means 10 drives the output signal of the first gating means 10 to its low voltage condition (see waveform B of FIG. 2). The base of the first transistor $Q_1$ goes low (see waveform C of FIG. 2) driving it off and causing the collector voltage at point D to rise (see waveform D of FIG. 2).

The output signal of the inverting gate 18 which is normally at a low voltage condition (see waveform E of FIG. 2) is changed to a high voltage level. Current then flows through the third resistor $R_3$ into the base of the second transistor $Q_2$ causing transistor $Q_2$ to conduct and thereby substantially grounding the output terminal 20 of the monostable circuit 8 (see waveform F of FIG. 2). The feedback connection, line 22, substantially grounds the second input connection to the first gating means to thereby latch the first gating means 10 rendering the monostable circuit insensitive to further trigger pulses and insuring a constant pulse width at the output terminal 20.

The state of the improved monostable circuit 8 remains in the above-described condition for a predetermined time T set by the exponential decay of the voltage across the timing circuit capacitor $C_1$ via resistor $R_1$ (see waveform C of FIG. 2). When the timing circuit capacitor $C_1$ discharges sufficiently to turn on the first transistor $Q_1$, the base current stops flowing in the second transistor $Q_2$ thereby turning off the second transistor $Q_2$.

When the second transistor $Q_2$ is turned off, its collector, which is connected to the second input connection of the first gating means 10, returns to the high level condition thus causing the output signal of the first gating means 10 to return to its high voltage condition. The output signal of the inverting gate 18 returns to the low voltage level and thus the quiescent conditions prevail. No further action takes place until receipt of a new trigger pulse at the input of the first gating means 10.

The function of the feed forward means 16 is to prevent false triggering of the monostable circuit 8 caused by noise signals on the power supply line 21. Without the feed forward means 16, a very small noise signal (on the order of 100 millivolts) on the line 20 could turn off the first transistor $Q_1$ causing a complete timing cycle to be initiated. The feed forward means 16 maintains the common emitter and base connection of respective first and second transistors $Q_1$ and $Q_2$ at substantially ground until a trigger signal is applied to the first gating means 10 thereby to prevent a false output signal at the output terminal 20.

The input signal to the inverting gate 18 is isolated from the slow rise of the signal during the decay of the charge on the capacitor $C_1$ at the common juncture of the third resistor $R_3$ and the capacitor $C_1$ by the diode $D_1$. Thus, the signal at the common juncture of the collector and base of respective first and second transistors $Q_1$ and $Q_2$, and consequently the output signal at terminal 20, has fast fall time characteristics. Also, the forward diode characteristics of the diode $D_1$ provide temperature compensation to match the voltage $V_{be}$ characteristics of the first transistor $Q_1$.

Figure 3:
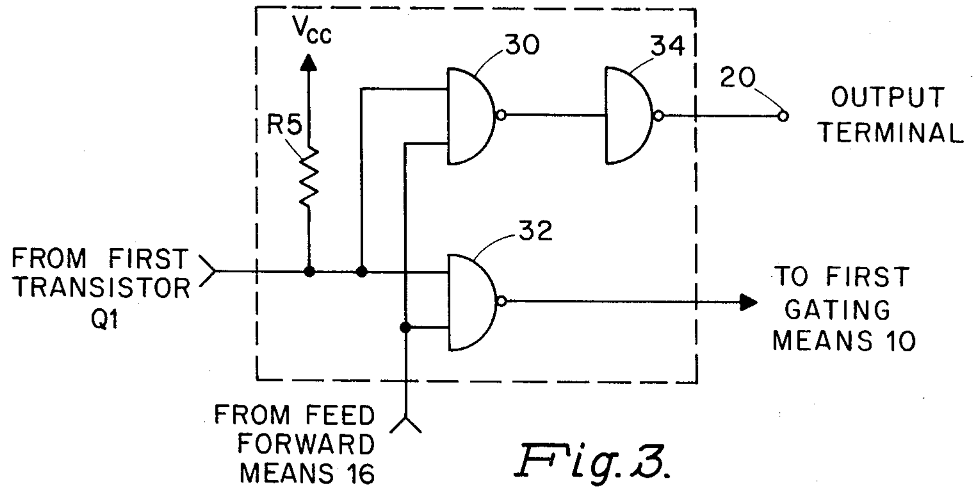
FIG. 3 is a logic diagram of an alternative buffer output circuit that can be employed in the monostable circuit of FIG. 1.

An alternative embodiment of a buffer output means that can be employed in the monostable circuit of FIG. 1 is shown in FIG. 3 and includes third and fourth gates 30 and 32, respectively, each having a first input connection from the first transistor $Q_1$ and a second input connection from the feed forward means 16. A fifth gate 34 has an input connection from the third gate 30 and has an output connection to the output terminal 20 of the monostable circuit 8. The output connection of the fourth gate 32 is connected to the second input connection of the first gating means 10.

The operation of the monostable circuit of FIG. 1 employing the buffer output means of FIG. 3 is similar to the circuit operation described hereinabove except that the output signals from the first transistor $Q_1$ and the inverting gate 18 are applied simultaneously to the third and fourth gates 30 and 32. As can be seen from waveforms D and E of FIG. 2, the respective output signals from the first transistor $Q_1$ and the inverting means 18 go in a positive direction thereby producing one output signal from the third gate 62 to the output terminal 20 via a second inverting gate 34 and another output signal from the fourth gate 32 to the second input terminal of the first gating means 10.

At the end of the timed period T, determined by the resistance and capacitance values of the first resistor $R_1$ and capacitor $C_1$, the first transistor $Q_1$ is turned on substantially grounding one input to each of the third and fourth gates. The output signals to the output terminal 20 and to the second input connection of the first gating means 10 are terminated causing the monostable circuit to return to its quiescent state.

Figure 4:
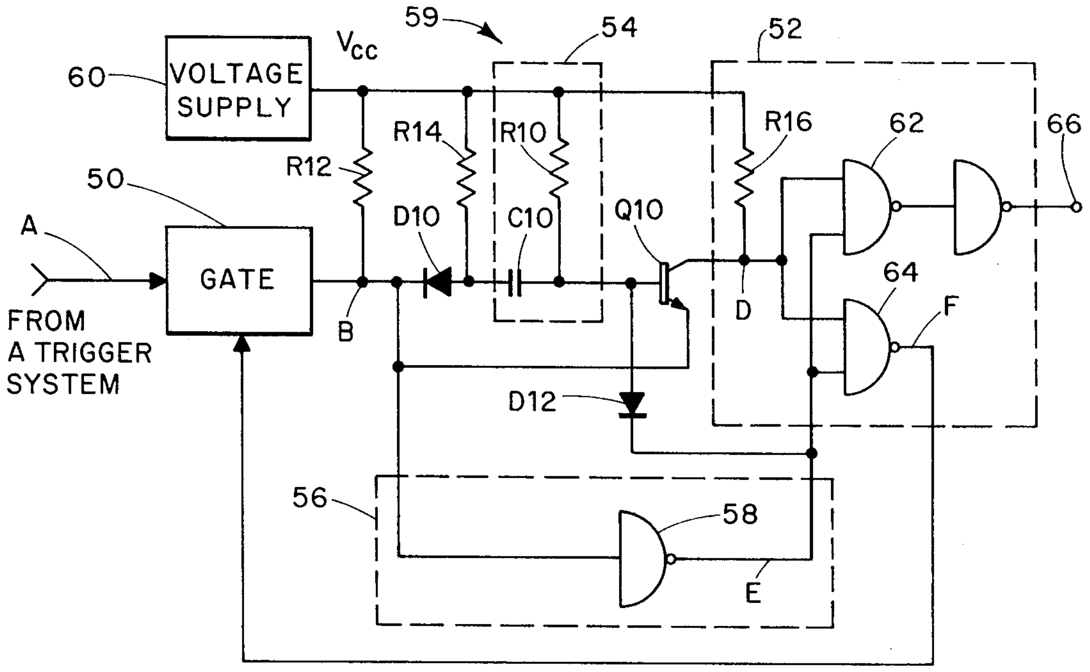
FIG. 4 is a schematic representation of another embodiment of an improved monostable circuit according to the present invention.

A refinement in the embodiment of a monostable circuit including the buffer output means of FIG. 3 is shown in FIG. 4 and has a first gating means 50, such as a Sylvania Electric Products Inc. integrated circuit SG80. The first gating means 50 has a first input connection from a trigger source (not shown) and a second input connection from an output buffer means 52 such as the embodiment shown in FIG. 3 and described hereinabove. A first diode $D_{10}$ is connected between the first gating means 50 and a timing circuit 54 such as a capacitor $C_{10}$ and a first resistor $R_{10}$.

Connected between the common juncture of the first gating means 50 and the first diode $D_1$ is the input connection of a feed forward means 56 such as an inverting gate 58, the output of which is connected to the first input connection of the buffer output means 52. Connected between the timing circuit 54 and the output buffer means 52 is a first NPN transistor $Q_{10}$, the base collector and emitter of which are connected respectively to the timing circuit 54, a second input connection of the output buffer means 52 and the common juncture of the first gating means 50 and the first diode $D_{10}$.

A second diode $D_{12}$ is connected between the base of the first transistor $Q_{10}$ and the first input connection of the buffer output means 52. Second, third and fourth resistors $R_{12}$, $R_{14}$ and $R_{16}$ are connected between a direct current power supply 60 and, respectively, the input connection of the first diode $D_{10}$, the output connection of the first diode $D_{10}$ and the collector of the first transistor $Q_{10}$. The output buffer means 52 includes second and third gates 62 and 64 each having a first input terminal connected to the collector of the first transistor $Q_{10}$ and a second output terminal connected to the inverting gate 58.

Under quiescent operating conditions, an output signal from the first gating means 50 is at a high voltage level. The combined action of the supply voltage and the second resistor $R_{12}$ holds the emitter of the first transistor $Q_{10}$ more positive than the base thereby maintaining the first transistor $Q_{10}$ in an off condition. The first input connections of the second and third gates 62 and 64 are maintained at a relatively high voltage condition because the first transistor $Q_{10}$ is cutoff while second input connections of the second and third gates 62 and 64 are maintained at a low voltage condition by the output condition of the inverting gate 58. Under quiescent conditions, the feedback signal is directed from the buffer output means 52 to the second input connection of the first gating means 50.

When a negative going input trigger signal is applied to the first gating means 50, the output voltage level drops causing the output signal of the inverting gate 58 to rise. Thus both the first and second input connections of the second and third gates 62 and 64 are at a high voltage condition causing the gates to open. The output signal of the third gate 64 is directed back to the second input connection of the first gating means to latch the first gating means and thereby not only rendering the monostable circuit 59 insensitive to another trigger signal during the timing cycle but also insuring a constant pulse width at the output terminal 66.

When the negative going pulse is applied to the first gating means 50, the emitter of the first transistor $Q_{10}$ is reduced to essentially zero potential, However, the potential at the base is also reduced by the action of first capacitor $C_{10}$ and the second diode $D_{12}$ (which is necessary to establish the initial charge in the first capacitor $C_{10}$) to thereby maintain the first transistor $Q_{10}$ in the off condition. When the capacitor $C_{10}$ has discharged to a voltage level sufficient to turn on the first transistor, the collector voltage, which is supplied to the first input connection of the second and third gates 62 and 64, drops causing the output voltage level of the second and third gates to rise. The high voltage level output from the third gate 64 unlatches the first gating means 50 causing the output level of the first gating means to return to a high level condition thereby cutting off the first transistor $Q_{10}$. Thus the first transistor is only conducting long enough to unlatch the first gating means 50 and restore the monostable circuit 59 to its quiescent condition.

The embodiment of FIG. 4 allows a wide variation in transistor parameters without affecting the circuit operation. This embodiment is particularly useful where very short output pulses are required as there is no saturated transistor employed in the circuit.

While there has been shown and described what are considered preferred embodiments of the present invention, it will be obvious to those skilled in the art that various changes and modifications may be made therein without departing from the invention as defined in the appended claims.

What is claimed is:

1. An improved monostable circuit comprising:

an output terminal;

first gating means having first and second input connections and an output connection and being operative to change the signal level at the output connection from a first predetermined signal level to a second predetermined signal level in response to third and fourth predetermined signal levels at said first and second input connections respectively;

a timing circuit having an output connection and an input connection from the output connection of said first gating means and being operative to determine the delay time of said improved monostable circuit;

buffer output means having an output connection to the second input connection of said first gating means and to said output terminal, a first input connection connected to the output connection of said timing circuit, and a second input connection, said buffer output means being operative in response to fifth and sixth predetermined signal levels at its first and second input connections to generate a feedback signal to said first gating means, said feedback signal corresponding to said third predetermined signal level;

driving means connected between said timing circuit and the first input connection of said buffer output means and being operative in response to a signal from said timing circuit to generate said fifth predetermined signal level at the first input connection of said buffer output means; and feed forward means connected between the common connection of said first gating means and said timing circuit and the second input connection of said buffer output means and being operative in response to the first predetermined signal level from said first gating means to inhibit said buffer output means and being operative in response to said second predetermined signal level to turn on said output buffer means, whereby said improved monostable circuit in response to a trigger signal at said first gating means generates an output signal pulse, the duration of which is determined by said timing circuit.

2. An improved monostable circuit according to claim 1 wherein said timing circuit includes:

a capacitor connected between the output connection of said first gating means and said driving means and being operative to store a voltage; and a resistor connected to the common connection of said capacitor and said driving means and cooperating with said capacitor to set the width of the output pulse at the output terminal of said improved monostable circuit.

3. An improved monostable circuit according to claim 1 wherein said buffer output means includes:

a source of reference potential;

first resistor having one end connected to a source of direct current energy;

second resistor having one end connected to said feed forward means; and first transistor circuit having its emitter connected to said source of reference potential, its collector connected to the other end of said second resistor and to said feed forward means and its base connected to the other end of said second resistor and to said driving means, said transistor means being operative to conduct in response to the fifth and sixth predetermined signal levels from said driving circuit and said feed forward means respectively.

4. An improved monostable circuit according to claim 1 wherein said buffer output means includes:

a third resistor having one end connected to a source of direct current energy;

second gating means having a first input connection to said driving means and to the other end of said third resistor, a second input connection to said feed forward means, and an output connection to the output terminal of said improved monostable circuit and being operative in response to said fifth and sixth predetermined signal levels to produce an output signal at said output terminal; and third gating means having a first input connection to the first input connection of said second gating means, a second input connection to the second input connection of said second gating means and an output connection to the second input connection of said first gating means, said third gating means being operative in response to said fifth and sixth predetermined signal levels to direct the feedback signal to said first gating means whereby said first gating means is insensitive to additional third predetermined signal levels until the timing cycle of said timing circuit has been completed.

5. An improved monostable circuit according to claim 1 wherein said driving means includes:

a source of reference potential; and second transistor circuit means having its emitter connected to said source of reference potential, its collector connected to the second input connection of said buffer output means and its base connected to the output connection of said timing circuit, said second transistor circuit means being operative in response to an output signal from said timing circuit to generate said fifth predetermined signal at the first input connection to said output buffer means.

6. An improved monostable circuit according to claim 1 including a second diode connected between the common connection of said first gating means and said feed forward means and said timing circuit means and being operative to isolate the input connection of said feed forward means from said timing circuit to thereby improve the fall time of the signal at the output terminal of said improved monostable circuit.

7. An improved monostable circuit according to claim 4 wherein said driving circuit means includes:

a first diode having one end connected to the first input connection of said buffer output means and the other end connected to the output connection of said first gating means;

a fourth resistor having one end connected to a source of direct current energy; and transistor means having its base connected to the other end of said first diode and to said timing circuit, its collector connected to said buffer output means, and its emitter connected to the common connection of the other end of said fourth resistor and said first gating means and being operative in response to a seventh predetermined signal level at its base to turn off said output buffer means and thereby terminate the signal at the output terminal of said monostable circuit.

8. An improved monostable circuit according to claim 2 wherein said buffer output means includes:

a source of reference potential;

first resistor having one end connected to a source of direct current energy;

second resistor having one end connected to said feed forward means; and first transistor circuit means having its emitter connected to said source of reference potential, its collector connected to the other end of said second resistor and to said feed forward means and its base connected to the other end of said second resistor and to said driving means, said transistor means being operative to conduct in response to the fifth and sixth predetermined signal levels from said driving circuit and said feed forward means respectively.

9. An improved monostable circuit according to claim 2 wherein said buffer output means includes:

a third resistor having one end connected to a source of direct current energy;

second gating means having a first input connection to said driving means and to the other end of said third resistor means, a second input connection to said feed forward means and an output connection to the output terminal of said improved monostable circuit and being operative in response to said fifth and sixth predetermined signal levels to produce an output signal; and third gating means having a first input connection to the first input connection of said second gating means, a second input connection to the second input connection of said second gating means and an output connection to the second input connection of said first gating means, said third gating means being operative in response to said fifth and sixth predetermined signal levels to direct an output signal to said first gating means whereby said first gating means is insensitive to additional third predetermined signals until the timing cycle of said timing circuit has been completed.

10. An improved monostable circuit according to claim 9 wherein said diving circuit includes:

a source of reference potential; and second transistor circuit means having its emitter connected to said source of reference potential, its collector connected to the second input connection of said buffer output means and its base connected to the output connection of said timing circuit, said second transistor circuit means being operative in response to an output signal from said timing circuit to generate said fifth predetermined signal at the first input connection to said output buffer means.

11. An improved monostable circuit according to claim 10 including a second diode connected between the common connection of said first gating means and said feed forward means and said timing circuit means and being operative to isolate the input connection of said feed forward means from said timing circuit to thereby improve the fall time of the signal at the output terminal of said improved monostable circuit.

* * * * *